J. H. SURRIDGE.
HEAT REGULATOR.
APPLICATION FILED AUG. 27, 1907. RENEWED JULY 9, 1910.
973,317.
Patented Oct. 18, 1910.
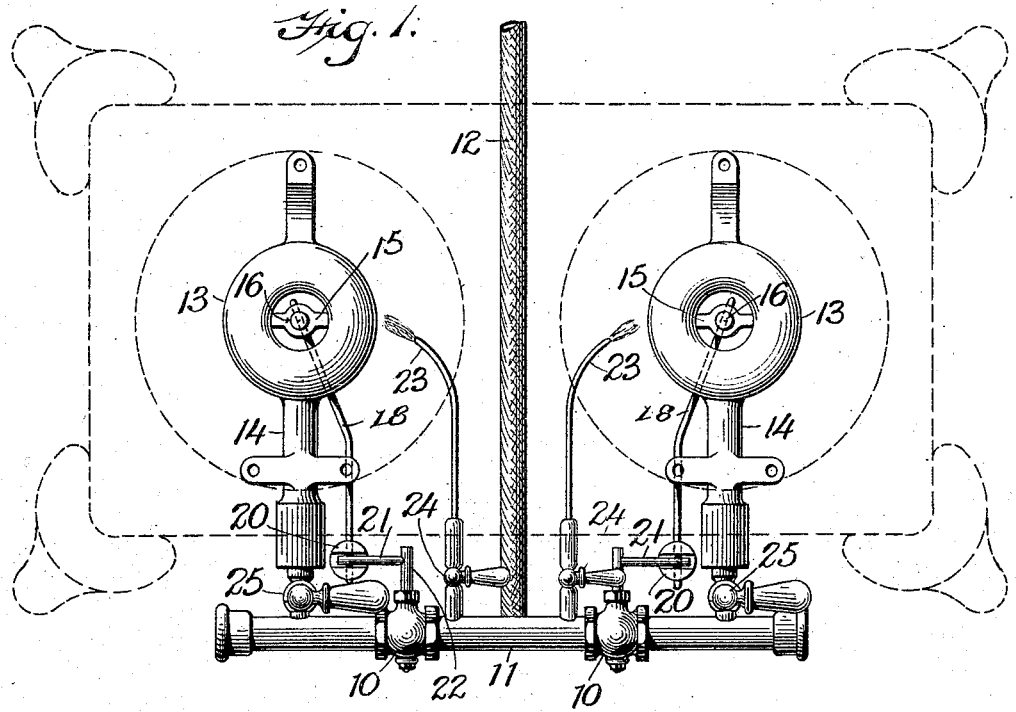
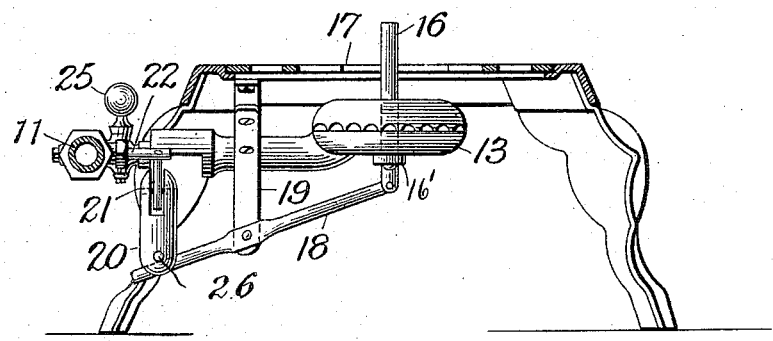
WITNESSES
INVENTOR,
John H. Surridge,
BY
ATTORNEYS

UNITED STATES PATENT OFFICE.

JOHN H. SURRIDGE, OF NEW YORK, N. Y.

HEAT-REGULATOR.

973,317.  Specification of Letters Patent.  Patented Oct. 18, 1910.

Application filed August 27, 1907, Serial No. 390,361. Renewed July 9, 1910. Serial No. 571,223.

*To all whom it may concern:*

Be it known that I, JOHN H. SURRIDGE, a citizen of the United States, residing at New York, in the county of New York and State of New York, have invented new and useful Improvements in Heat-Regulators, of which the following is a specification.

This invention relates to heat regulators and more particularly for the heating means employed in cooking and its object is to provide a cock or switch with certain levers to be controlled by cooking utensils which fit upon the heater to provide the heat supply but when these utensils are removed the supply is shut off as will be more fully described in the following specification set forth in the claim and illustrated in the drawings, where the same reference characters are used to designate the same parts of the various views.

Figure 1 is a plan view of a gas stove with this invention applied thereto. Fig. 2 is a cross sectional view of same.

In the use of heating stoves of this description a great loss and waste of the heating material occurs on account of the supply not being cut down while the utensils are temporarily removed and the object of this invention is to overcome this very serious objection and to arrange certain levers which are influenced by the utensils so as to operate the cut off controlling the source of heat. The preferred form of regulator is adapted to be applied to gas heaters and consists of the valves 10 which are applied to the supply pipe 11 having a nipple depending from same and to which the rubber tube 12 is secured, the other end of the tube being attached to a gas bracket or other source of supply. These valves 10 may be of such number as corresponds with the burners 13 and although two are shown in the drawings more or less may be used. Connecting pipes 14 supply the gas from the pipe 11 to the burners 13 and working vertically in the spider 15 of the burner is a rod 16 projecting above the surface of the grid 17 so that when a pan or other cooking utensil is placed on the grid above the burner it forces the rod 16 downward so that its upper end is flush with the top of the stove. Said rod 16 is provided with a collar 16′, said collar being disposed on the rod at a point beneath the burner 13, thereby limiting the upward movement of the same after the vessel has been removed from the stove. The lower end of the rod 16 is connected with a lever 18 pivoted on a bracket 19 depending from the top of the stove and the outer end of this lever supports a weight 20 carried by the lever 21 on the valve stem 22 and it will be seen that when the rod 16 is depressed it carries upward the weight 20 causing it to turn the valve stem 22 which controls the supply of gas so as to turn it on when this operation occurs. But when the utensil is removed it is obvious that the weight falls carrying up the rod 16 and turning the valve stem 22 so as to shut off the supply of gas.

The supply pipe 11 is provided with pilot jets 23 to supply each burner with a light when the supply is cut off so that when the rod 16 is depressed the light is ready to ignite the gas supplied to the burner 13. These pilot jets are controlled by means of the cocks 24 and similar cocks 25 are provided for each of the burner connections.

The weight 20 is pendent from the lever or arm 21 projecting from the valve stem 22 and its lower end is notched to receive and straddle the end of the lever 18 remote from the end pivoted to the rod 16, thereby preventing relative lateral displacement of said weight and lever 18. In order that the point of application of the weight 20 may be centralized upon the lever 18 a pin 26 extends across the notch formed in the lower end of the weight 20. The weight 20 is of sufficient mass to operate the valve 10 and to depress the outer end of the lever 18 and elevate the rod 16. When the rod 16 is depressed the weight 20 is elevated and opens the valve 10. By having the weight 20 pendent from the arm 21 and engaging loosely with the outer end of the lever 18, it may adapt itself to different relative positions of the rod 16 when depressed to a greater or less extent by vessels having variously formed bottoms whether straight or elevated. In the event of the rod 16 being depressed by a flat bottom vessel so as to come flush with the top of the frame 17, the weight 20, after being moved upward a certain distance to shut off the valve 10, moves outward upon the lever 18, thereby preventing straining of the valve operating mechanism while at the same time permitting the flat bottom vessel to rest squarely upon the top of the frame.

What I claim as new and desire to secure by Letters Patent is:

In combination a frame, a burner supported beneath the top of said frame, a vertically movable rod projecting above the top of said frame and adapted to be depressed by a vessel or other article placed upon the frame over the burner, a lever pivotally supported between its ends by the said frame and having its inner end connected with said vertically movable rod, a valve for controlling the supply of fuel to the burner, an arm extending laterally from the stem of said fuel controlling valve, and a weight pivoted to and pendent from said arm and having its lower end notched to receive and sit astraddle of the outer end of said lever and movable thereon and adapted to centralize the application of the weight upon the lever, the parts being arranged to operate substantially as and for the purpose specified.

In testimony whereof, I affix my signature in presence of two witnesses.

JOHN H. SURRIDGE.

Witnesses:
JAMES F. DUHAMEL,
H. G. HOSE.